United States Patent Office 3,141,878
Patented July 21, 1964

3,141,878
PROCESS FOR THE PREPARATION OF N-(5-NITRO - 2 - FURFURYLIDENE) - 3 - AMINO-2- OXAZOLIDONES
Pieter H. Hellinghuizer, Amsterdam, Netherlands, assignor to Orgahell N.V. (Naamloze Vennootschap), Amsterdam, Netherlands, a corporation of the Netherlands
No Drawing. Filed June 13, 1960, Ser. No. 35,394
Claims priority, application Netherlands June 16, 1959
1 Claim. (Cl. 260—240)

This invention relates to a new process for the preparation of the chemotherapeutics agent N-(5-nitro-2-furfurylidene)-3-amino-2-oxazolidone as well as new chemical compounds useful as intermediates in said process.

More particularly, this invention relates to the preparation of 2-hydroxyethyl 5-nitro-furfurylidene carbazates from cyclic carbonates, hydrazine hydrate and 5-nitro-2-furfural or a functional derivative thereof, e.g., the diacetate. These carbazates may then be converted to oxazolidones by replacing the hydroxy group with halogen and treating said halogenated compound with an alkanolate, an alkali hydroxide or an alkali carbonate.

N - (5-nitro-2-furfurylidene)-3-amino-2-oxazolidone is disclosed in U.S. Patents 2,742,462, and 2,652,402.

The process of the present invention is characterized in that the starting materials comprise cyclic alkylene carbonates such as ethylene and propylene carbonate, and hydrazine or hydrazine hydrate.

The process of the present invention is best represented by reference to the following equations:

A.

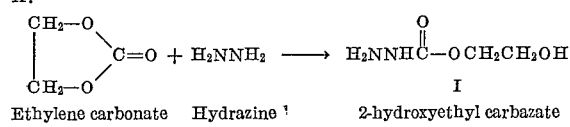

Ethylene carbonate   Hydrazine    2-hydroxyethyl carbazate

B.

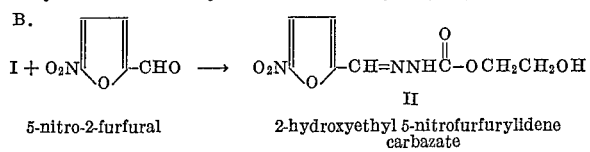

5-nitro-2-furfural    2-hydroxyethyl 5-nitrofurfurylidene carbazate

C.

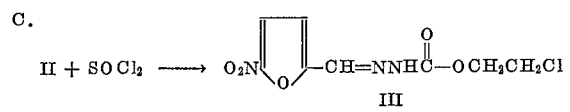

Thionylchloride    2-chloroethyl 5-nitrofurfurylidene-carbazate

D.

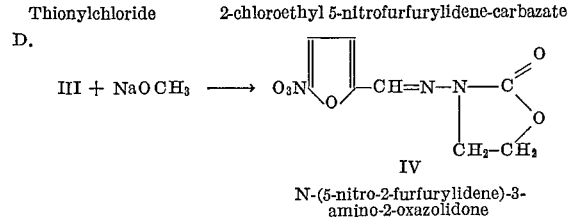

N-(5-nitro-2-furfurylidene)-3-amino-2-oxazolidone

Products II and III above are new and novel chemical compounds which are not only useful as intermediates in the preparation of N - (5 - nitro-2-furfurylidene)-3-amino-2-oxazolidones but as coccidiostats.

The use of a solvent is not essential to the above reactions, however, the use of such solvents as dimethylformamide, benzene, methanol, etc. is preferred.

The following examples more fully illustrate the process of this invention as well as the new and novel compounds used therein.

EXAMPLE 1

1. *Preparation of 2-Hydroxyethyl Carbazate*

900 g. of ethylene carbonate, dissolved in 1 liter of methanol, is added to 500 g. of hydrazine hydrate (100%). The mixture is refluxed for 10 minutes. After cooling, the desired compound crystallizes. Melting point is 85–90° C. After crystallization from methanol the melting point is 92° C. The yield is 80 to 85%. From the mother liquor a second quantity can be recovered, in consequence of which the yield is raised to about 95%.

EXAMPLE 2

2. *Preparation of the Nitrofurfurylidene Compound*

A solution of 141 g. of 5-nitro-2-furaldehyde in 1 liter of alcohol is added to 120 g. of 2-hydroxyethyl carbazate. A yellow crystalline compound precipitates, which is filtered off. After being washed with alcohol or water, if desired, the compound is dried. A yield of 96 to 97% of the desired substance is obtained, with a melting point of 168° C.

EXAMPLE 3

3. *Second Preparation of the Nitrofurfurylidene Compound*

To a solution of 243 g. of 5-nitro-2-furaldehyde diacetate in 500 cc. of water is added 250 cc. of ethanol, 50 cc. of concentrated sulphuric acid (as saponifying agent), and 120 g. of 2-hydroxyethyl carbazate. After 10 minutes' boiling in a vesel equipped with a reflux condenser, the desired compound is obtained in a yield of 95 to 96% and with a melting point of 168° C.

EXAMPLE 4

4. *Preparation of 2-Chloroethyl 5-Nitrofurfurylidene Carbazate*

6 g. of 2-hydroxyethyl 5-nitrofurfurylidene carbazate is mixed with 50 cc. of thionyl chloride and heated for 20 minutes in a flask with a reflux condenser on a water-bath. After cooling, the crystalline mass formed is filtered off and washed with benzene and subsequently with alcohol. After drying, 6.2 g. of the desired compound is obtained, i.e., a yield of 96%. Melting point 204° C. M.—261.5.

In the above example a fairly large excess of thionyl chloride has been used, which serves at the same time as solvent. However, a smaller quantity of thionyl chloride, viz 3 cc., will suffice if, e.g., 10 cc. of dimethyl formamide is used as solvent.

EXAMPLE 5

5. *Preparation of N-(5-Nitro-2-Furfurylidene)-3-Amino-2-Oxazolidone*

25 g. of the substance obtained according to Example 4, dissolved in 100 cc. of methanol, are boiled in a flask equipped with a stirrer, a reflux condenser, and a separating funnel. After this, a solution of 2.3 g. of sodium in 50 cc. of methanol is added dropwise through the separating funnel. After cooling of the reaction mixture the solid substance thus formed is filtered off and washed with methanol. In this way 21 g. (i.e., a yield of 91%) of the compound in question is obtained, with a molecular weight of 225 and a melting point of 255–256° C. (with decomposition). In the reactions according to Example 5 it is also possible to use NaOH, KOH, $Na_2CO_3$, $K_2CO_3$, and similar alkali metal compounds, dissolved in water, for instance.

N - (5-nitro-2-furfurylidene)-3-amino-5-methyl-2-oxazolidone is prepared by substituting propylene carbonate for the ethylene carbonate of Example 1 and repeating the procedure outlined in Examples 1 through 5. When propylene carbonate is used, the intermediates will be 1-methyl-2-hydroxyethyl carbazate; 1-methyl-2-hydroxyethyl-5-nitrofurfurylidene-carbazate; and 1 - methyl - 2-chloroethyl-5-nitro-furfurylidene-carbazate.

What is claimed is:

The process for preparing a N-(5-nitro-2-furfurylidene)-3-amino-2-oxazolidone of the formula:

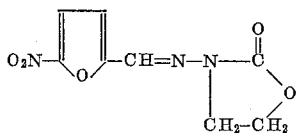

wherein R represents a member of the group consisting of hydrogen and methyl which comprises the steps: (1) reacting a 2-hydroxyalkyl 5-nitrofurfurylidene carbazate of the formula:

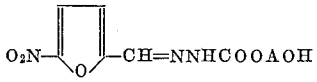

wherein A represents a member of the group consisting of —CH$_2$CH$_2$— and

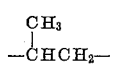

with thionyl chloride at a temperature of about 80° C. to form a 2-chloroalkyl 5-nitrofurfurylidene carbazate of the formula:

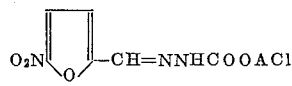

wherein A has the aforesaid significance and (2) subjecting said 2-chloroalkyl 5-nitrofurfurylidene carbazate to the action of an agent selected from the group consisting of sodium methoxide, alkali metal hydroxides and alkali metal carbonates in the presence of methanol and under the influence of heat.

References Cited in the file of this patent
UNITED STATES PATENTS

| | | |
|---|---|---|
| 2,319,481 | Stillman et al. | May 18, 1943 |
| 2,742,462 | Gever | Apr. 17, 1956 |
| 2,759,931 | Ebetino et al. | Aug. 21, 1956 |
| 2,759,932 | Ebetino et al. | Aug. 21, 1956 |
| 2,802,838 | Deutschman et al. | Aug. 13, 1957 |
| 2,937,190 | Straley et al. | May 17, 1960 |

OTHER REFERENCES

Audrieth: Chemistry of Hydrazine (1951), page 214.

Delaby et al.: Comptes Rendus, vol. 234, pages 2374–5 (1952).

Sasaki et al.: Pharm. Bull., Japan, vol. 2, pages 123–7 (1954).

Delaby et al.: Comptes Rendus, vol. 238, pages 1714–1716 (1954).

Gever et al.: Journ. of the Am. Chem. Soc., vol. 77, pages 2277–2281 (1955), QD1 A5.

Chemical Abstracts II, vol. 50, Cols. 10851–2 (1956) [abstract of Ohyana, Bull. Inst. Chem. Research, Kyoto Univ., vol. 34, 25–55 (1956)].

Delaby et al.: Comptes Rendus, vol. 246, pages 3353–3355 Q46A14 (June 16, 1958).

Eloy et al.: Bull. Soc. Chim. Belges, vol. 68, pages 412, 423 and 425–431 (July 15, 1959), QD 1 S39.

UNITED STATES PATENT OFFICE
CERTIFICATE OF CORRECTION

Patent No. 3,141,878                                    July 21, 1964

Pieter H. Hellinghuizer

It is hereby certified that error appears in the above numbered patent requiring correction and that the said Letters Patent should read as corrected below.

Column 3, lines 4 to 9, the formula should appear as shown below instead of as in the patent:

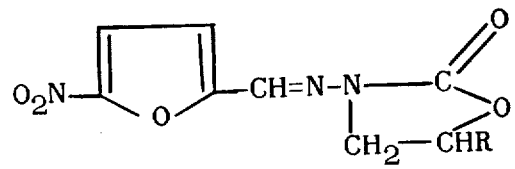

Signed and sealed this 5th day of January 1965.

(SEAL)
Attest:

ERNEST W. SWIDER                              EDWARD J. BRENNER
Attesting Officer                             Commissioner of Patents